United States Patent [19]
van der Lely et al.

[11] Patent Number: 5,769,025
[45] Date of Patent: Jun. 23, 1998

[54] MILKING APPARATUS

[75] Inventors: Ary van der Lely, Maasland; Olaf van der Lely, Steinhausen; Karel van den Berg, Bleskensgraaf; René Fransen, Vlaardingen, all of Netherlands

[73] Assignee: Maasland, N.V., Maasland, Netherlands

[21] Appl. No.: 507,614

[22] Filed: Jul. 26, 1995

[30] Foreign Application Priority Data

Jan. 26, 1993 [NL] Netherlands ............................ 9300143

[51] Int. Cl.⁶ ...................................................... A01J 5/00
[52] U.S. Cl. .................................... 119/14.42; 119/14.08; 119/14.18; 119/14.46
[58] Field of Search .............................. 119/14.01, 14.08, 119/14.09, 14.18, 14.42, 14.43, 14.46, 670, 14.02

[56] References Cited

U.S. PATENT DOCUMENTS

| | | | |
|---|---|---|---|
| 2,794,420 | 6/1957 | Recchia | 119/14.18 |
| 2,865,391 | 12/1958 | Duncan | 137/205 |
| 2,873,722 | 2/1959 | Duncan et al. | 119/14.09 |
| 3,139,857 | 7/1964 | Merritt et al. | 119/14.46 |
| 3,554,166 | 1/1971 | Belden | 119/14.01 X |
| 4,034,714 | 7/1977 | Umbaugh et al. | 119/14.18 |
| 4,432,700 | 2/1984 | Icking | 119/14.07 |
| 4,970,989 | 11/1990 | Lidman | 119/14.02 |
| 5,042,428 | 8/1991 | Van Der Lely et al. | 119/14.18 |
| 5,080,040 | 1/1992 | van der Lely et al. | 119/14.09 |
| 5,085,172 | 2/1992 | Borgman et al. | 119/14.09 |
| 5,195,456 | 3/1993 | van der Lely | 119/14.09 |
| 5,272,997 | 12/1993 | Van Der Lely et al. | 119/14.09 X |
| 5,390,627 | 2/1995 | van der Berg et al. | 119/14.08 |

FOREIGN PATENT DOCUMENTS

| | | | |
|---|---|---|---|
| 0 385 539 A2 | 2/1990 | European Pat. Off. | |
| 0 399 604 A1 | 11/1990 | European Pat. Off. | |
| 0 519 544 A1 | 12/1992 | European Pat. Off. | |
| 73 25 950 | 11/1973 | Germany | |
| 284398 | 11/1990 | Germany | 119/14.18 |
| 910092 | 1/1993 | Netherlands | |
| 1266870 | 3/1972 | United Kingdom | |
| 2104368 | 3/1983 | United Kingdom | 119/14.43 |
| 2 136 102 | 9/1984 | United Kingdom | |
| 2194830 | 3/1988 | United Kingdom | 119/14.18 |

OTHER PUBLICATIONS

International Search Report, PCT/NL94/00014, 2 May 1994 (3 pages).

*Primary Examiner*—Robert P. Swiatek
*Assistant Examiner*—Elizabeth Shaw
*Attorney, Agent, or Firm*—Penrose Lucas Albright

[57] ABSTRACT

A milking apparatus comprising a circulation line in a milk circuit which includes a bulk milk tank, and a pump for circulating milk around the circuit including through the tank and through the circulation line. There are one or more milking compartments for automatically milking animals, such as cows, which are connected to the circulation line by supply lines. A milk filter can be incorporated in a circulation line or in a supply line or both. In one embodiment the milk filter is automatically renewable. It comprises a band of filtration material wound on two bobbins wherein the filter band intercepts the milk line at a bias cut between two clamping plates, one of which can be pivoted whereby the filter band is advanced automatically on a bobbin. Other filtration units are disclosed which may be manually replaced, one of which is contained in the bulk milk tank. Each milking compartment can be isolated whereby the milk lines, a deaeration container, an implement for cleaning animal's teats and udders, and the interiors and exteriors of the teat cups can be cleansed and rinsed with various combinations of hot and cold water, acid and alkaline liquids, and a disinfectant fluid.

62 Claims, 5 Drawing Sheets

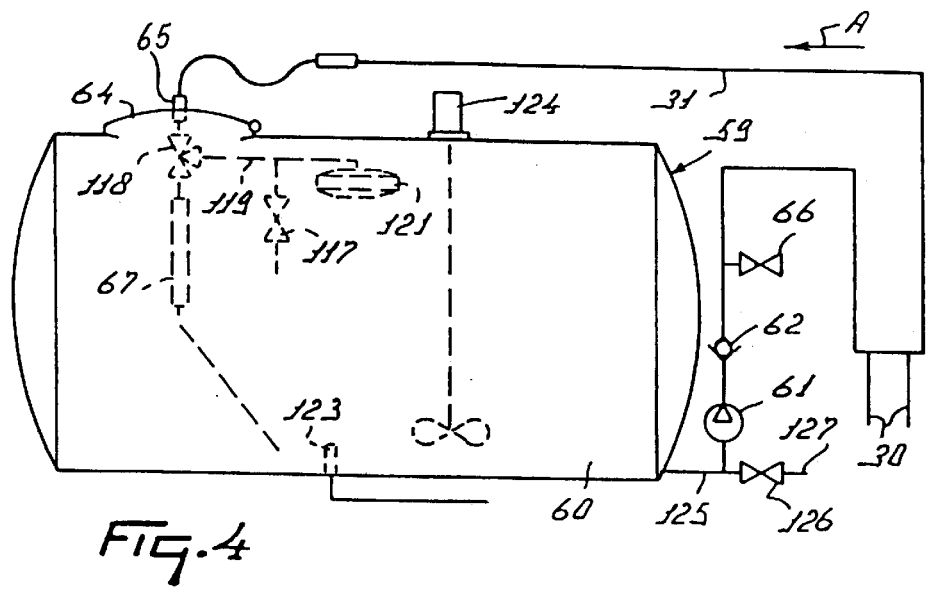
Fig. 4
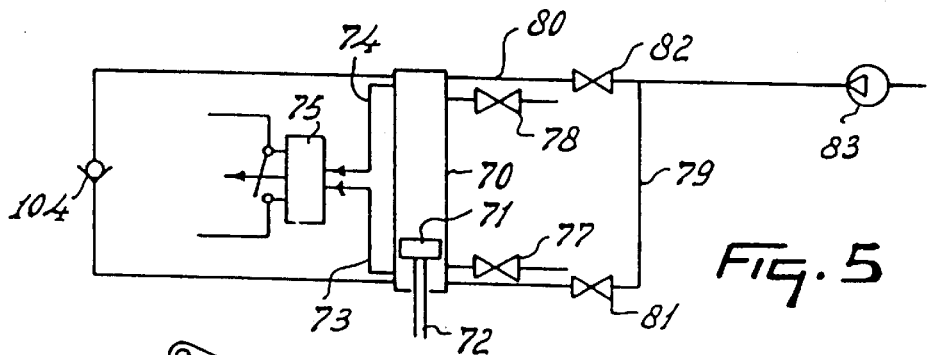
Fig. 5
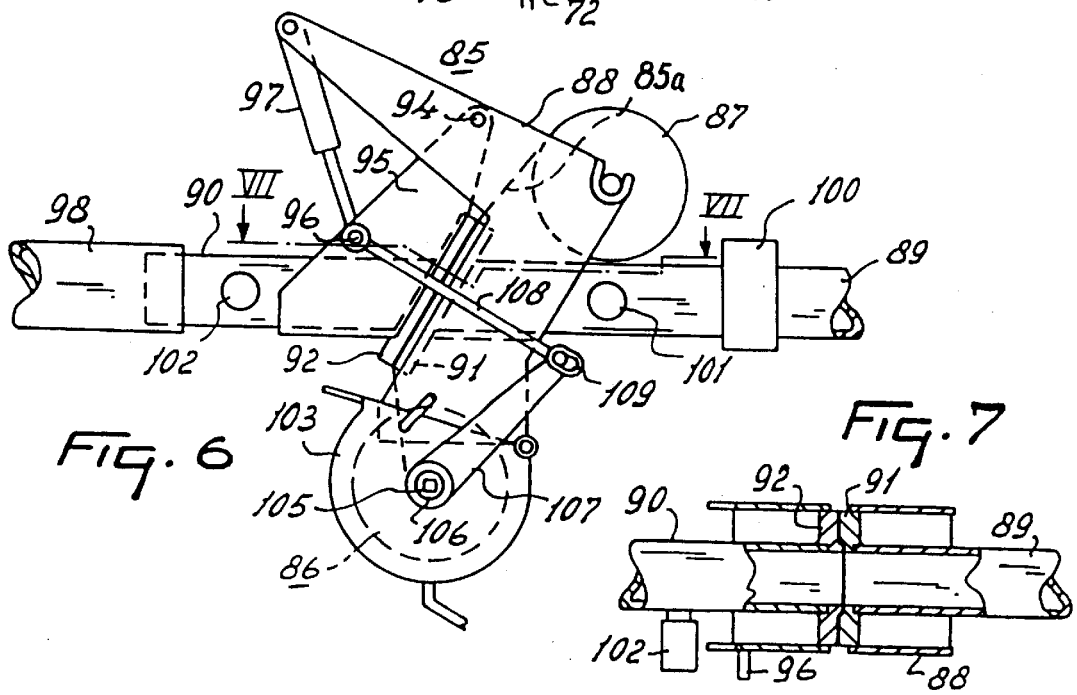
Fig. 6
Fig. 7

MILKING APPARATUS

RELATED APPLICATIONS

This patent application is a Continuation of PC/NL94/00014 (filed Jan. 21, 1994 designating the United States), which claims the priority date of The Netherlands' patent application Ser. No. 9300143, filed Jan. 26, 1993.

The present invention relates to a milking construction including a ring line in which a milk tank and a pump for circulating the milk through the tank and through the ring line are incorporated, the construction comprising one or more supply lines to each of which a milking machine may have been connected.

Such a milking construction is disclosed in, e.g. DE-U-7325950. The present invention has for its object the improvement of such constructions in general and in particular the improvement of a ring line and supply line construction to be used in a milking machine. According to the invention this can be accomplished by incorporating at least one milk filter in the ring line and/or in a supply line. In this case the milking construction can be compact and a better quality of the milk will be obtained.

In an advantageous embodiment, according to the invention, the milk filter is included between the ring line end via which the milk is discharged into the tank and a supply line connected to that end. Such a construction renders it possible to provide that only one single milk filter will serve more than one milking construction. In a further advantageous embodiment the construction is designed such that the supply line of a milking plant is connected to the ring line in a place between the non-return valve and the filter. Such an arrangement ensures that the freshly milked milk passes at all times through the filter before it arrives at the milk in the milk tank.

In a specific embodiment of the invention, the ring line includes a valve which in a first position releases a connection to a line portion incorporating the discharging end of the ring line and in a second position to a line portion comprising a spray head. Such a construction renders it possible to clean in an advantageous manner also the milk tank with the aid of the ring line in an advantageous manner by, in accordance with the invention, having the ends of the spray heads in the top portion of the tank and the line portion discharging the milk in the lower portion of the milk tank, which has the advantage that it can be avoided that the milk will mix with air. Excessive mixing of the milk with air results in the decomposition of the fat molecules and consequently in the milk turning sour and rancid. Therefore the present invention also comprises a milking construction having a milk tank provided with a milk supply line, to which a milking plant is connectable, characterized in that the milk supply line includes a valve which in a first position releases a connection to a line portion having an end which freely discharges in the tank, and in a second position to a line portion provided with one or more spray heads. In this situation it is advantageous for a spray head to be located in the upper part of the milk tank, preferably near the upper wall of the tank, whilst the free end discharges near the bottom of the tank to provide a flow of milk which has mixed with air to the least possible extent.

According to the invention, the filter which is more in particular designed as a tubular filter can be in a position both inside and outside the tank. In the first case the tubular filter may be connected to the lid of the tank, so that after lifting the lid the filter can be exchanged in a simple manner. In a second embodiment, in which the tubular filter is arranged outside the tank, a valve has been accommodated in the line, taken in the direction of flow, before the filter, which valve can be operated both manually and by means of a computer, whereas a similar type of valve, or a non-return valve, as the case may be, is accommodated in the line behind the filter. All this prevents milk present over the filter from flowing from the ring line during exchange of the tubular filter. The non-return valve behind the tubular filter prevents milk from escaping from the milk tank in accordance with the communicating vessel-principle.

A further perfectioning of the milking construction exists, in accordance with the invention, in that at or near the line portion in which the filter is incorporated, means are present with the aid of which the process computer controlling the milking arrangement can be informed of a necessary replacement of the filter. This results, in accordance with the invention, in that given processes in the milking construction, such as the operative state of the circulation pump of the ring line and emptying of the collecting glass of a milking plant, are postponed. Such a provision renders it possible to replace the filter in an advantageous manner. A further perfectioning of the construction consists, in accordance with the invention, in that the ring line is split, at least for a part thereof, into two line portions, in each of which a filter is incorporated and wherein the bifurcation is realized with the aid of a valve which in a first position can pass the milk flow along both milk filters and in a second and a third position passes the milk only along one of the two milk filters. In a milking arrangement of such a construction a milk filter can be exchanged without the need for interrupting the operation of the milking plant and/or the circulation pump of the ring line. Since the milk can flow along both milk filters, milk will not be stagnant for a long period of time during normal operation in neither of the two branches.

In a more simple embodiment, which is mainly aimed at preventing an interruption of the milk plant and/or the circulation pump, the bifurcation in the line may be formed by a valve which in a first position releases a connection to a first filter and in a second position to a second filter.

The invention therefore also relates to a construction including a ring line, in which a milk tank and a pump for circulating the milk through the tank and the ring line are incorporated, characterized in that the ring line is bifurcated into two parallel extending line portions, in each of which a filter is incorporated, and which bifurcation is formed by a valve which in a first position releases a connection to one line portion and in a second position a connection to the other line portion.

According to the invention, in a still further perfectioning of the milking construction, the milk filter is accommodated in a process computer-energizable device for automatically renewing the filter. In such a construction neither the circulation pump, nor the connected milking construction need to be stopped for renewal of the filter, whilst furthermore no intervention of the farmer is required any more. The invention therefore also relates to a milking construction including a milking plant, characterized in that the milk when discharged from the milking plant, for example to a milk tank, passes a milk filter accommodated in a process computer-energizable device for automatically renewing the filter. Such a construction for automatically renewing the filter is of eminently interest for an automated milking robot. According to the invention, such a filter is renewed by moving the filter in a sectional plane of a milk line, more particularly in a direction transversely to line portions which are movable with respect to each other and which are fitted with a flange for the purpose of clamping and guiding the filter. Because of the very small thickness of the filter, and because of the small amount of additional space required during moving of the filter, such an construction is eminently suitable for incorporation in a supply line of the milk storage construction. In a different embodiment in accordance with the invention, such an automated device for moving the filter is accommodated in a milk line which is connected to the teat cup. More in particular such a device is accommodated in each one of the separate milk lines which are connected via a teat cup to a quarter of the udder of a milk animal. This increases the filter surface area, provides a feature to detect irregularities in each of the quarters separately and keeps the connections as compact as possible. In such a device the facing planes of the flanges are coated with an elastic material and the line portions are pivotal relative to each other by means of a pivotal shaft which is arranged such in the device that it is pivotal about a shaft projecting from the contact plane of the flanges. In this situation the filter is capable of being wound around bobbins which are provided on facing sides of the relevant milking construction and can be controlled and driven by means of motors and from the process computer.

A still further feature of the invention consists in that the collecting glass of a milking plant is connected substantially directly to the ring line of a milk storage plant. For that purpose the ring line is guided, in accordance with the invention, at least substantially underneath the collecting glass. Arranged between the collecting glass of a milking plant and the ring line there may be present, in accordance with the invention, a valve and/or a discharge pump which may have been connected to a supply line of the ring line, the collecting glass and valve and/or discharge pump and the ring line being at least substantially immediately contiguous to each other.

For a better understanding of the invention and to show how the same may be carried into effect, reference will now be made, by way of example, to the accompanying drawings.

FIG. 4 is a schematic representation of a milk storage implement in accordance with the invention;

FIG. 5 is a schematic representation of the circuit to prevent the robot arm in accordance with the present application from being overloaded in the vertical direction;

FIG. 6 is a side view of a portion of the milking construction in accordance with the invention for automatically renewing the milk filter of the construction;

FIG. 7 is a partly cut-out plan view taken on the line VII—VII in FIG. 6;

Corresponding components in the drawings have been given the same reference numerals. The invention is in no way limited to the embodiments depicted and described here; they only serve as an illustration of the inventive idea.

Figure 1:
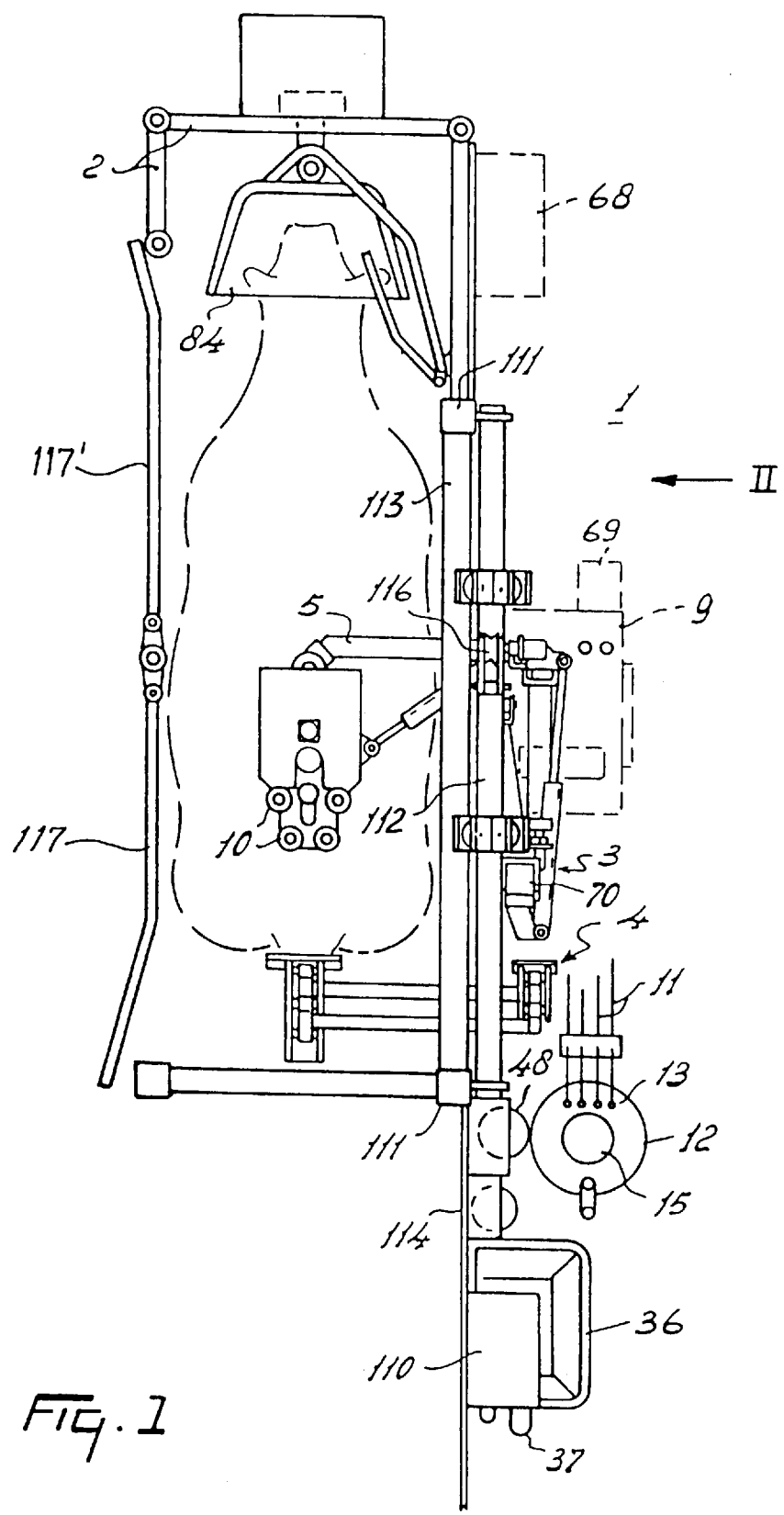
FIG. 1 is a plan view of a schematic lay-out of a milking construction for milking cows in accordance with the invention.
Figure 2:
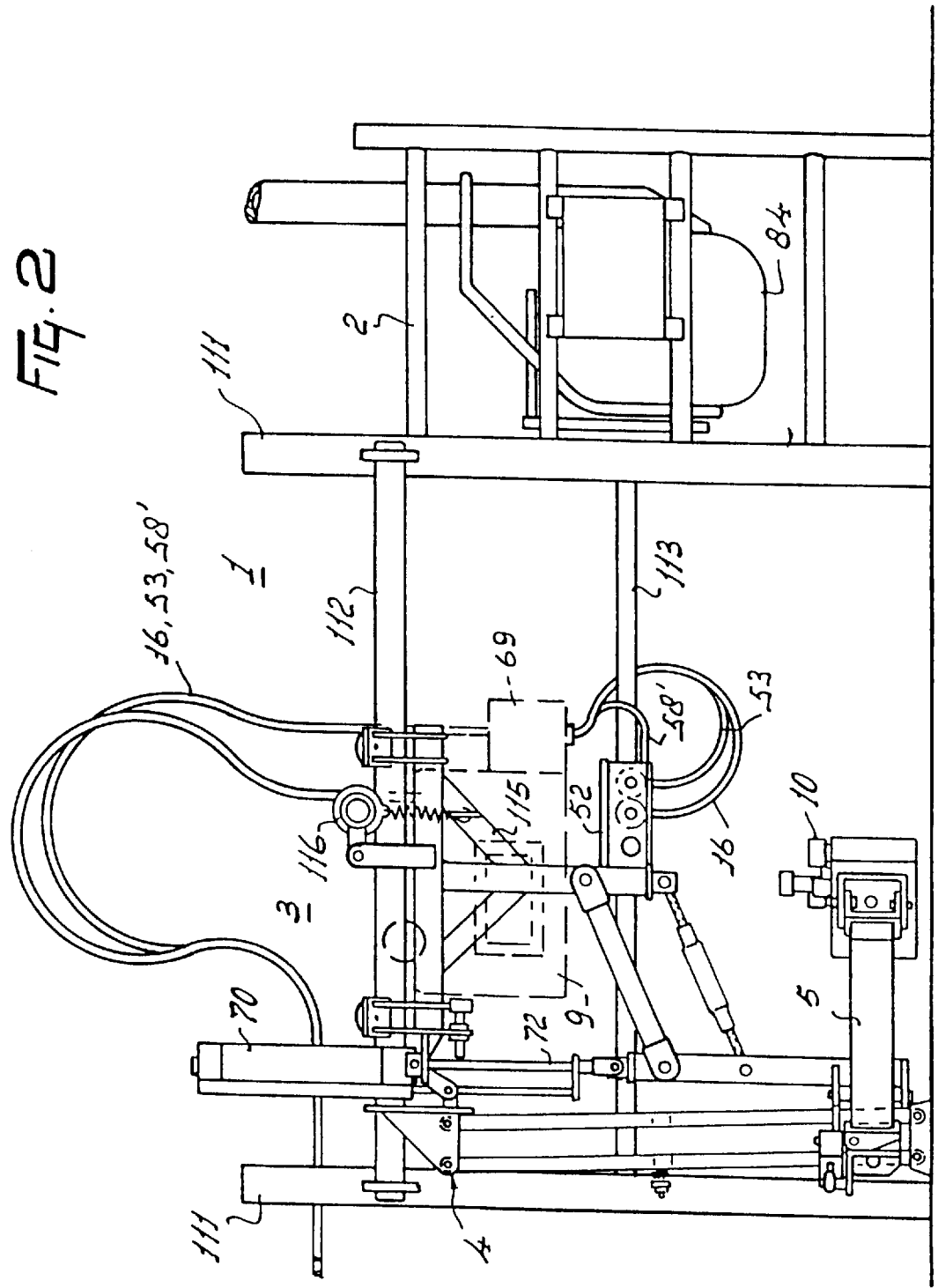
FIG. 2 is an elevational view taken in the direction of arrow II in FIG. 1.

FIGS. 1 and 2 show a milking construction 1 including a milking parlour defined by a railing system 2, in which an animal to be milked is positioned during a milking run. The milking construction includes a milking robot 3, alternatively denoted milking plant, with which the animals are automatically milked. The milking robot 3 is shown in greater detail in the non-prepublished Netherlands patent application 9100992 and, in sofar the present description does not mention otherwise, is operative in accordance with the description in the European patent application 0360354. The milking arrangement further includes a positioning device 4 for positioning the milking robot 3 in the longitudinal direction of the milking parlour, as described in the Netherlands patent application 9000836. In addition, the milking construction 1 includes, as is shown in the likewise non-prepublished Netherlands patent application 9101636 and again in sofar the present description does not mention otherwise, sensors 6, 7, 8 for determining the vacuum in the teat cups 10, the electric conductivity of the milk supplied by the animal, and for determining whether a milk flow has started or stopped, as the case may be, in the teat cups 10. The teat cups 10 are located at the end of a robot arm 5 of the robot 3. The milking construction 1 comprises a line system, still further to be described, equipped with inter alia milk and vacuum lines, in which shut-off valves are incorporated. Both valves incorporated in the line system and the robot 3 are controllable from a computer 9. In sofar the word valve or cock will be used in the present description, a valve or cock controlled by the computer is meant in all cases.

The milking construction in accordance with the present invention is equipped with two computers 9, 68 which operate independently of each other. The first one thereof is the process computer, denoted "the computer" in the sequel of this description, and is disposed on a frame work 115, which is movable in the longitudinal direction of the milking parlour, for the robot arm 5. The process computer 9 controls all motional actions and decisions of and for the robot 3 and a milk storage device still to be described and a rinsing device for the robot and the milk storage device. The motional actions include inter alia the energization of adjusting cylinders of motors for starting the robot arm 5, the teat cups 10, the cleaning device 52, still to be described, and the valves and pumps in the line system also described in the sequel of the description for transportation of the milk obtained, the vacuum and the rinsing fluid. The decisions which are automatically taken by the computer 9 on the basis of internally available data and data obtained via sensors, include inter alia the decision whether to continue or to stop milking of the animal after one or more teat cups get uncoupled, and all remaining decisions described in the present description. The external data which are important for the milking operation are applied to the computer 9 in suitable manners which are known per se. During operation the computer 9 is in permanent contact with, or can at least be continuously interrupted by, the various sensors and valves associated with the construction 1 and the read unit of an information carrier fastened to the collar of a milk animal. Said last information carrier provides the computer 9 with data for the identification of the animal present in the milking parlour. The second computer 68 is in a fixed position and is mounted near the feed trough 84, at that side of the railing system 2 where the milking robot 3 is located. The second computer 68 controls a feeding implement positioned at the head end of the milking parlour and records the relevant data as regards the milk yields of the milk animals, such as the quantity of milk supplied, the conductivity of the milk and the milk temperature. To that end the second computer 68 has a connection to a milk level sensor 15 in a milk collecting glass 12, to the conductivity and temperature sensor 7 and to a second read unit, not further shown, for identification of the milk animal present in the milking parlour. The milk collecting glass 12 is alternatively denoted milk de-aeration device or vent vessel. Said first and second read unit are both attached to a rim, which during feeding is near the neck of a feeding milk animal, of the feed trough 84 located in the milking parlour.

Figure 3:
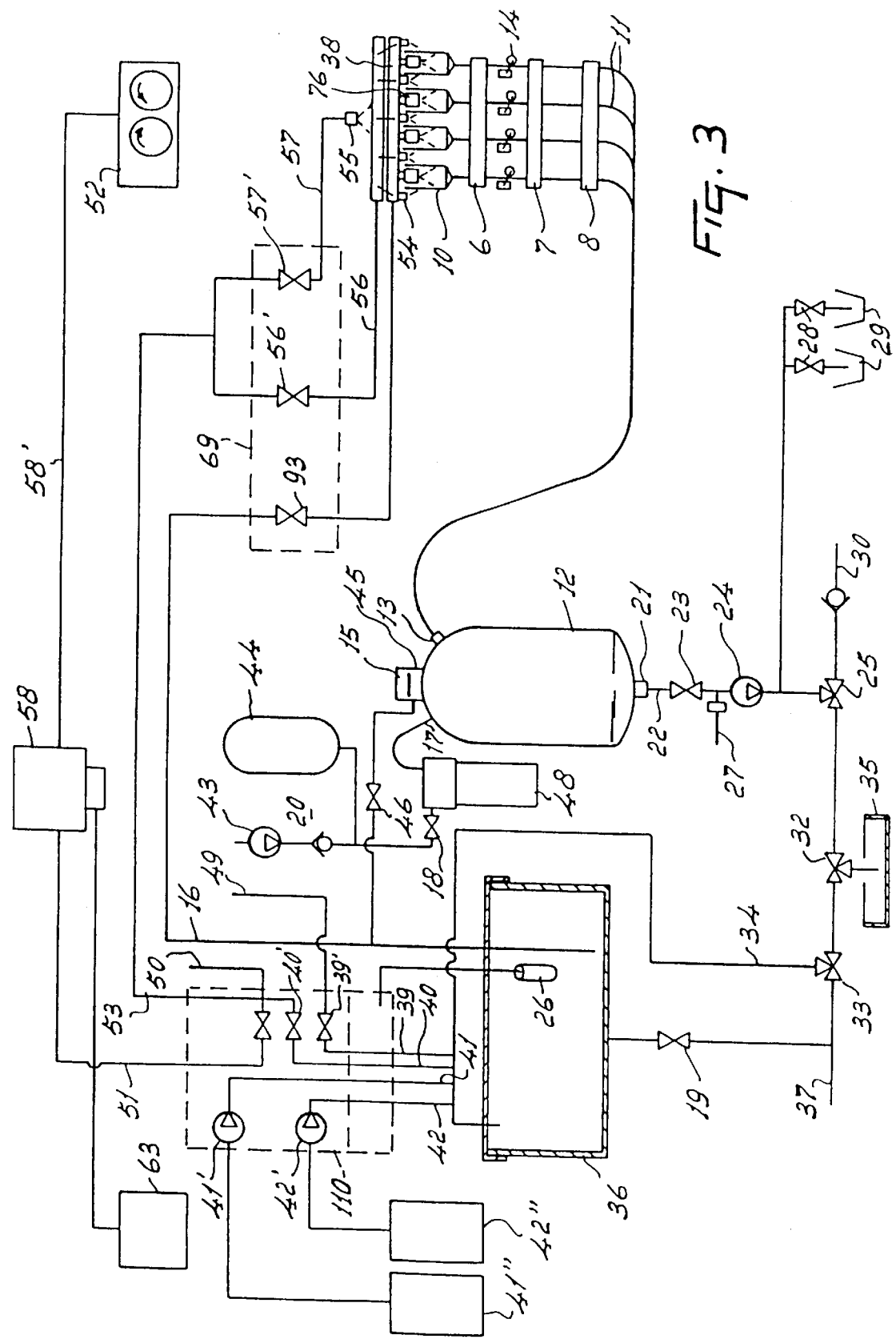
FIG. 3 is a schematic representation of the line system for milk and cleaning fluid, associated with the milking robot.

FIG. 3 schematically shows the line system for the milking construction 1 and the associated means for discharging milk from a teat cup 10 to a cooled milk tank 50. Via a milk line 11 each teat cup 10 is connected to a collecting glass 12. Each milk line 11 incorporates, arranged one after the other, the sensor 6 for determining the vacuum in teat cups 10, a sensor 7 for determining the conductivity and the temperature of the milk and the sensor 8 for the detection of a milk flow. The sensors 6, 7, 8 are each accommodated in a block-like housing. Each of the three block-like housings is connected to all four milk lines and always comprises four identical sensors 6, 7 or 8, of which in all cases one is incorporated in each milk line 11. In a typical embodiment the block-like housings are interconnectable. Immediately behind a vacuum sensor 6, which is included in each one of the lines 11 in the region of the connected teat cup 10, shut-off valve or cock 14 controlled by the computer 9 is incorporated in a line 11.

Disposed on the collecting glass 12 there are nozzles 13 to which the milk lines 11 are connected. The nozzles 13 are located in the upper spherical portion of the collecting glass 12, halfway the upper central aperture and the cylindrical portion of the collecting glass 12. At that side of the collecting glass that relative to the upper central aperture faces the nozzles 13, the collecting glass 12 has a further nozzle 17 to which via a valve 18 which is energizable from the computer a vacuum circuit 20 which forms part of the milking construction 1 is connected. The collecting glass 2 is formed as a cylindrical central body with a spherical bottom and upper side. An aperture through which a sensor 15 is inserted is provided in the upper side of the collecting glass 12 in its midway point. The level of the milk in the collecting glass 12 can be determined with the aid of the sensor 15. Together with the sensor 15 there is also provided in the said aperture of the collecting glass 12, for the purpose of cleaning the interior side of the collecting glass 12, a spray member to which a line 16 is connected. A nozzle 21 to which a line 22 is connected is provided in the bottom of the collecting glass 12 near its midway point. The line 22 accommodates a computer-operated valve 23, to which a fluid pump 24 is connected. The pump 24 is preferably a centrifugal pump, in which the drive shaft is arranged in a vertical position. The other end of the fluid pump 24 is connected to a computer-operated first three-way valve 25. A sensor in the form of electrodes 27 is arranged in the line between the collecting glass 12 and the pump 24, between the valve 23 and the pump 24. This sensor applies a signal to the computer, from which it can be determined whether milk is locally present in the line. In dependence on the signal supplied by the electrodes 27 the computer provides a signal for putting the centrifugal pump 24 in or out of operation.

Connected to the line portion between the pump 24 and the first three-way valve 25 there are lines which incorporate computer-controllable valves 28, which end in sample bottles 29 for taking milk samples. Said first three-way valve 25 releases in a first position a connection to a short feed member 30 of preferably not more than a few centimetres in length. Incorporated in this line portion is a non-return valve 30', which prevents fluid from flowing back to the three-way valve 25. The feed member 30 is in connection with a circulating line 31, alternatively denoted ring line, which together with a milk tank 60 constitutes a milk storage construction 59. In a second position the three-way valve 25 releases a connection to a second three-way valve 32. The latter releases on the one hand a connection to a third three-way valve 33 and on the other hand to a receptacle 34 for waste milk. The third three-way valve 33 has one end connected to a line 34 which ends in a reservoir 36, which is sealed against dust and dirt, for the preparation and storage of rinsing fluid and has its other end connected to a drain pipe 37 leading to the sewer system. Ending in the line 34 to the reservoir 36 there are, taken in a direction from the third three-way valve 33, arranged one after the other a hot-water supply line 39 which is fitted with a computer-controllable valve 39', a similar line 40 for cold water and two drain pipes 41, 42 for an acid and a basic cleaning agent, respectively. These agents are supplied from reservoirs 41" and 42" with the aid of computer-controlled displacement pumps 41', 42' which are incorporated in the lines 41, 42. Because of the aforesaid construction of the lines 39–42 for cleaning agent and water the lines 41, 42 for the cleaning agents can be kept short and the cleaning agent which might find its way into the pipe line 34 is adequately rinsed off by the water from the pipe lines 39 and 40.

The water supply lines 39, 40 are each provided with a computer-controllable valve 39' and 40', respectively, and are connected to the supply pipe lines 49, 50 for cold and warm water, which generally are available outside the milking construction 1. In the present embodiment the connection to the cold water supply pipe 50 branches off within the milking construction 1 into three pipe lines, namely the said line 40 to the reservoir 36, a line 51 to a cleaning implement 52 for cleaning the teats of the udder of the animal to be milked and to a line 53. The line 53 leads to spray heads 54 for cleaning the outside of the teat cups 10 and to a spray head 55 for cleaning the upper side of a cleaning cassette 38 used for cleaning the implement 52. The cleaning implement 52 and the cassette 38 with spray heads for the interior side of the teat cups 10 are identical to the embodiment described in the non-prepublished Netherlands application NL-A 9101676. Said last line 53 splits into the line portions 56, 57 for the benefit of the above-mentioned spray heads 54, 55 near the starting position of the end of the robot arm. Both branches 56, 57 are fitted with a valve 56' and 57', respectively. The line to the spray heads 54 for spraying the outside of the teat cups 10 branches off in the cleaning cassette 38 to several spray heads 54. The spray heads 54 project vertically between the ducts for the spray heads 76 for spraying the interior side of the teat cups 10, with the object of spraying the outside of the teat cups 10. The branch 57 ends in the spray head 55 which is directed to the upper side of the cassette 38, on which during operation dirt from the implement 52 for cleaning the udders may collect. Namely, the cleaning implement 52 is mounted on top of the cassette 38 which is retained on top of the teat cups 10 by means of the vacuum, and is moved by the robot arm 5 to the udder of the animal to be milked. The valves 93, 56 and 57 are together housed in a protective cabinet 69, in which the relevant lines are fixed in position directly before and after their interruption by a relevant valve unit.

A water pressure-driven pump and mixing implement 58 is incorporated in the line to the cleaning implement 52. This implement 58 pumps chlorine from a vessel 63 and mixes it with the water from the water supply line 51, so that the portion of the line 51 to the pump 58 conveys a chlorine water mixture for rinsing and disinfecting the cleaning implement 52.

Incorporated in the rinsing water reservoir 36 there are a pipe line 16 for conveying rinsing fluid, a level sensor 26 and a line 34 for the feed-back of rinsing fluid from the milk glass 12. The line 16 branches off to form on the one hand a first branch leading to a cleaning cassette 38 for the teat cups 10 and on the other end a second branch leading to the upper side of the collecting glass 12. The branch to the cleaning cassette 38 leads via the space over the milking robot 3 to the location in which the teat cups 10 are present in the quiescent state of the robot arm. The last portion of the line is flexible and is provided with an ample loop to allow tracking of the motions of the milking robot. Near the teat cups 10 the line 16 accommodates a computer-controlled valve 41. In the cleaning cassette 38 the rinsing fluid is conveyed via a duct system to four spray heads 76 which each uniformly distribute the rinsing fluid along the interior walls of the teat cups 10. The driving force for the rinsing fluid is here the vacuum which is to be applied also for the benefit of the milking operation via the milk lines 11 and the collecting glass 12 in a vacuum reservoir 44 which the aid of a pump 43. In addition to the said pump 43 and the vacuum reservoir 44, the vacuum circuit 20 also includes an implement for separating fluid 48, which is necessary to prevent the fluid from penetrating into the pump 43. The fluid separator 48 is provided in the vacuum line between the pump 43 and the vacuum reservoir 44 on the one hand, and the line portion to the collecting glass 12, in which each valve 18 is incorporated, on the other hand. A plurality of milking robots can be connected to the vacuum circuit. Each of these further milking robots is connected via a line 16 to one and the same rinsing reservoir.

The wall of the collecting glass 12 is cleaned via a spray member 45 which is contained in the central upper aperture and to which the second branch of the line 16 is connected. From the spray member 45 rinsing fluid is sprayed in a lateral and slightly upward direction from a ring which partly projects into the collecting glass 12. This construction has for its effect that the rinsing fluid is distributed as a film along the entire interior wall surface of the milk glass 12. That portion of the line 16 that is branched off to the collecting glass 12 is further provided with a computer-controlled valve 46. The supply of rinsing fluid to the spray member 45 is realized, as also holds for the spray heads 42, by the vacuum prevailing in the milk glass 12. The rinsing fluid collected in the milk glass 12 is conveyed, depending on the type of rinsing and/or the phase of the rinsing operation, with the aid of computer signals via the afore-mentioned three-way valves 25, 32, 33 to either the rinsing fluid reservoir 36, or to the line 37 for discharge. to the sewer.

Also in accordance with the invention, the milking construction 1 is of such a structure that the railing system 2 can be detached from a rack formed by two posts 111, against which a partition 114 is applied. The posts 111 are interconnected by two horizontally extending beams 114, 113, the upper beam 112 having a round profile and serving as a straight guide for a frame 115 for the suspension of the robot arm 5. In this situation the motion of the frame 115 is effected by a wheel which is pushed by spring action against the straight guide 112 and is driven by the motor which is controlled by the computer 9. Attached to the partition 114 there are all the attributes belonging to the milking construction, such as the collecting glass 12, the fluid separator 48, the milk pump 24, the sample-taking implement 28, 29, the lines 22, 34, 39–42, 51, 53, 56, 57, the rinsing fluid reservoir 36, the protective cabinet 110, holders for the vessels 41" and 42" and the chlorine vessel 63, the chlorine pump 58 and the second computer 68. Attached to the mobile frame 115 there are the robot arm 5, the adjusting cylinder 70, the motor 116, the computer 9 and the protective cabinet 69. To ensure that the frame 115 and the robot arm 5 can freely move, portions before and behind the protective cabinet 69 of the lines 51, 53 and 58' are flexible and applied with a loop. The above-described construction allows that a large portion of the milking construction, among which the milking robot 3, can be mounted and tested in the factory. Testing only requires connections for electricity, cold and warm water, and discharge pipes for test fluid which may originate from the valves 25, 32, 33, or 19 and a plug for the electronic connection of the computer to the control of the access gates 117, 117' which give access to the milking parlour, and to the rear unit. The construction renders a compact transportation packing of the tested milking arrangement possible.

FIG. 4 shows the afore-mentioned milk storage construction 59. The circulating line 31 incorporates, located near the bottom side of the milk tank 60 a pump 61 which at regular intervals, or continuously, as the case may be, f lushes at a low speed the line 31 which is insulated from heat absorption. Immediately behind the pump 61 a non-return valve 62 is accommodated in the line 31. Substantially immediately after this non-return valve 62 a valve 66 for the supply of air is also accommodated in the line 31. The circulating line 31 is by means of one end in an open connection with the bottom side of the milk tank 60 and, seen in a direction from the end of the milk tap of the tank 60, comprises a first predominantly horizontally extending line portion, in which there are arranged, one after the other, the pump 61, the non-return valve 62 and the air supply valve 66. Thereafter the line merges into a predominantly vertically extending portion which, to allow an overhead crossing, merges into a horizontal portion which extends towards the milking robot 4. Near the robot 3 the pipe line extends predominantly vertically to a level which is located relatively low above the soil, and thereafter curves back to return along substantially the entire route just described to the upper side of the milk tank 60. In the said curve near the robot a T-member is incorporated, to which the supply member 30 is connected. If so desired a plurality of robots can of course be connected to this point for discharging their milk to one and the same storage implement. The said low-lying portion of the ring line is in this situation passed through the area below the collecting glass 12, so that for the connection of this glass to the ring line the shortest possible distance can be preserved. In the present embodiment of the milking construction this implies that the collecting glass 12, the valve 23, the pump 24 with the sensor 27 provided near the inlet thereof and the three-way valve 25 are immediately, if not substantially immediately, contiguous to each other.

Above the tank 60 the return portion of the milk line 31 merges into a flexible portion which is connected to a feed-through pipe 65 arranged in the lid 54 of the tank 60. A three-way valve 118 is connected to that end of the feed-through pipe 65 that is incorporated in the tank 60. In a first position this valve releases a connection to a remaining portion of the milk ring line 31, a bevelled end of which ends just above the bottom of the tank 60, at a distance from the supply end of the line 31. In accordance with the invention, the fact that the milk is discharged at a slight height above the soil ensures that the absorption of air in the milk is limited. Consequently this construction counteracts decomposition of fat molecules and consequently prevents the milk from turning sour and rancid. In the remaining portion of the line 31, that is to say in the tank 60 there is further incorporated a construction which is known per se for accommodating a so-called thimble filter 67. To enable removal of the thimble filter 67 the remaining portion of the line 31 is assembled from two portions which are screwed together.

In a second position the three-way valve 118 releases a connection with a line portion 119 which is used exclusively for rinsing the tank 60. The end of this line portion 119 is provided with a spray head 121 which is induced by the pressure of the rinsing fluid flow to make such a circular motion that at least substantially the entire interior wall of the milk tank 60 can be cleaned. Arranged between the three-way valve 118 and the spray head 121 there is a valve 120 which is also controllable by the computer. Via this valve 120 the rinsing fluid can, if so desired, flow freely and consequently faster than through the spray head 121, into the tank 60. A branched-off discharge line 125 is arranged between the pump 61 and the supply inlet of the line 31. Incorporated in this discharge line there is a computer-controllable valve 126 which leads to a discharge outlet 127, to which a coupling member of a discharge line can be connected. A grid, not shown, which covers an outlet to the sewer is located below the discharge outlet.

The tank 60 further accommodates a level sensor 123 which is connected to the computer 9. The tank is also provided with a motor-drivable stirrer 124 for keeping the milk in motion. Cooling members, not shown in the drawing, of a cooling device which is controllable by the computer 9 are arranged along the bottom of the tank 60. The intensity of the cooling by the cooling device is made to depend, in accordance with the invention, via the computer 9, on the signal produced by the level sensor 123. The cooling intensity is kept low more particularly when there is only a very small quantity of fluid in the tank. This prevents freezing of milk drops caused by the stirrer when the milk level is low, on that portion of the bottom wall and/or along the edge of the milk surface that still extends above the milk level.

FIG. 5 shows the layout of a safety device in the adjusting cylinder 70, which in the present case is a pneumatic cylinder, by means of which the robot arm 5 can be moved up and down by means of compressed air. The wall of the adjusting cylinder 70 accommodates near two ends, that is to say in actual practice on both sides of the plunger 71 of the cylinder rod 72, a measuring pipeline 73, 74 which leads to a sensor 75 for recording the difference in pressure between the cylinder compartments located on both sides of the plunger 71. If the difference in pressure between the compartments exceeds above and below the plunger 71 a preset value, which at least corresponds to the weight of the robot arm 5, the sensor 75 conveys a signal indicating an overload to the computer. To produce the signal use can be made of either a slide resistor or a contact switch, as shown in FIG. 5. As long as the signal continues, the computer continues to supply a signal in response to which a valve 77 is opened. As a result thereof the space under the plunger 71 is in connection with the atmosphere, so that the plunger 71 easily and rapidly moves downwardly. Thus, the robot arm 5 yields, when pressure is exerted thereon by, for example, a leg of an animal, so that the risk of deformation or different types of damage to the robot arm is significantly reduced. The non-return valve 104 in the connecting line between the compartments below and above the piston ensures that the robot arm 5 is not pushed further down when its bottom side hits an obstacle, such as the floor or a foot of a farmer. In addition, the required supply lines 79, 80 for compressed air are provided on both compartments. The supply of air is determined by the computer by means of valves 81, 82 incorporated in these lines. For the supply of compressed air both lines are connected to a compressed air pump 83.

FIGS. 6 and 7 illustrate a construction for a milk filter 85 which automatically renews itself, with which a milking construction in accordance with the invention may be provided. The milk filter 85 is then in the form of a film which is wound about two bobbins 86, 87. The bobbins are supported by a plate-like carrier 88 attached to a tubular milk line 89 which is passed between the bobbins 86, 87. In the region of the bobbins 86, 87 the milk line is severed and provided with two flanges 91, 92 which are provided on the respective ends created by the cut. The flanges 91, 92 are coated on their facing planes with an elastic synthetic resin material, so that the filter film 85 can be confined in a leak-tight manner between the flanges 91, 92. The flanges are placed obliquely, in the present embodiment at an angle of approximately 45° to the supplying line portion 89, whereby a relatively large filter surface area is obtained. The flange 91 at the supplying milk line portion has an upwardly directed hollow profile which guides the film 85, whereas the flange 92 at the milk discharging line portion 90 has a spherical profile of a matching shape, so that when the flanges are pressed together a proper fit and sealing of the flange portions is guaranteed. Both line portions 89, 90 are pivotal relative to each other in a pivotal point 94 located outside the plane of intersection of the flanges 91, 92. For this purpose the carrier 88 extends partly to over the flanges 91, 92 and the discharging line portion 90. Attached to the discharging line portion 90 there is a holder 95 which extends vertically and upwardly and in said pivotal point 94 is connected to the carrier 88. The pivotal point 94 is located on a line which extends perpendicularly to the plane of intersection between the flanges 91, 92 at approximately ⅕ of the distance between this plane and that end of the carrier 88 that is located on the same line and above the discharging line portion 90. Between the end of the carrier 88, above the discharging line portion 90 and a connection point 96 located near the discharging line portion 90 there is pivotally provided an adjusting cylinder 97 which is energized by the computer. In the region of the connection point 96 the discharging line portion 90 merges into a flexible line portion 98. In the immediate vicinity of the place of cut, the supplying line portion 89 is further provided with a computer-controllable valve 100. Taken in the direction of flow, that is to say in the direction from the valve 100 to the filter, there is provided in the ring line behind the filter device a non-return valve, which is not shown in the Figure. In addition, both the supplying and the discharging milk line portions 89, 90 are provided in the vicinity of the point of cut with pressure sensors 101, 102. The lower bobbin 86 is placed interchangeably in a receptacle 103, which is filled with disinfectant and also serves as a drip can for milk drops which may form during detaching of the flanges 91, 92 from each other. An arm 107 is mounted on the shaft 105 of the bobbin 86 by means of a ratchet mechanism 106, which arm 107 has its end connected to the point of connection 96 for the adjusting cylinder 97 on the discharging line portion 90 via a pivotally arranged intermediate rod 108. The connection of the intermediate rod 108 and the arm 107 for the bobbin 86 has a slotted hole 109 which is arranged such that on energizing the adjusting cylinder 97 the flange portions 91, 92 are first removed from each other, before the arm 107 is moved. During the closing motion of the adjusting cylinder 97 the arm is moved in the return direction via the intermediate rod 108. During the reverse motion of the intermediate rod 108 the ratchet mechanism 106 prevents rotation of the shaft 105 of the bobbin 86, so that the new piece of filter material is kept in its place.

According to the invention, such a device for the automatic renewal of the filter can be accommodated in the ring line, and preferably in the part between a supply line and the milk-discharging end of the ring line. Furthermore, because of the small thickness of the filter and the required flanges, the device is eminently suited for accommodation in a milk supply line 30 which must be kept as short as possible. In this case the mechanical portion of the device, amongst which the carrier 88, the cylinder 97 and the bobbins 86, 87 is connected to a component part of the milking construction, which part is in a fixed position at some distance from the line 89. In a further advantageous embodiment of the invention the device for the automatic renewal of the filter is incorporated in a milk line which is connected to one of the teat cups to be connected to a milk animal. This has the advantage that the filter surface area can be increased and more specifically that any impurities can be detected for each quarter of the udder of a milk animal. The locations outside the ring line have the advantage that the milk obtained need pass only once through a possibly contaminated filter. Moreover, in accordance with the invention, contact of the milk with a contaminated filter can be significantly reduced by renewing the filter each-time after a milk animal has been milked.

Figure 8:
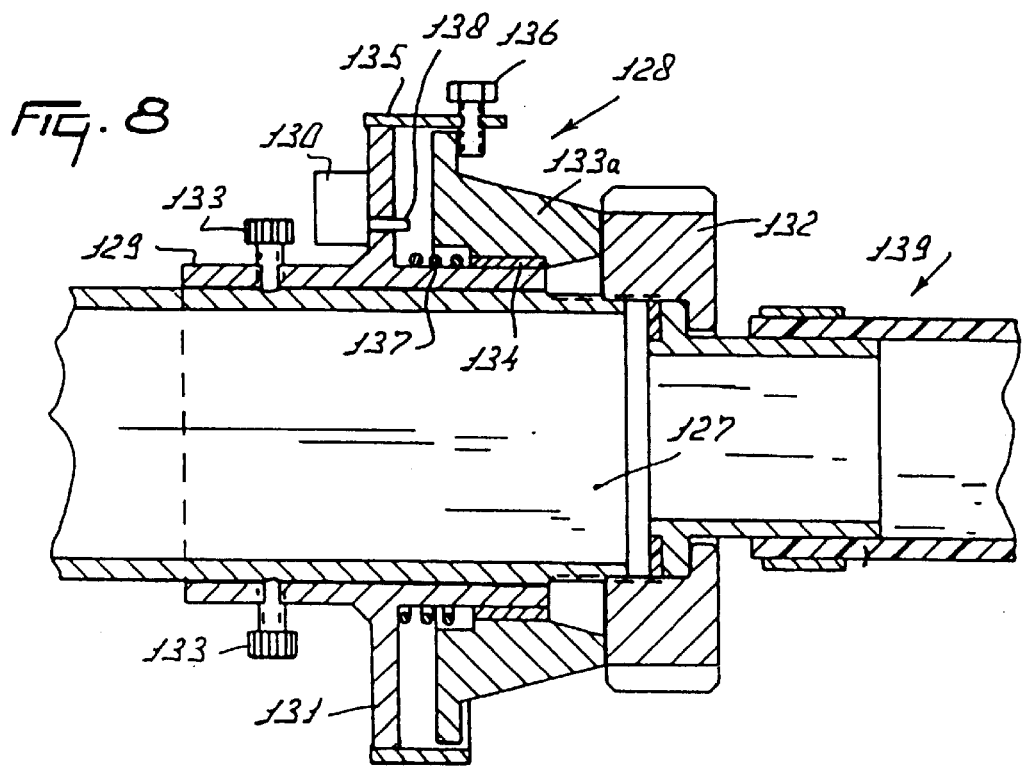
FIG. 8 is a cross-sectional view of a detection device on the discharge outlet for the milk storage implement.

FIG. 8 shows a detection device 128 for the computer-controlled detection whether a discharge tube for removing milk from the storage device 59 has been coupled or not coupled thereto. The device comprises a tubular portion 129 on which, via a projection, in the present case a flange 131, a contact switch 130 is attached, in such a manner that it is operable in only one direction parallel to the tube 129. When this switch 130 is depressed, this is the signal for the computer 9 that a discharge tube has been coupled to the discharge outlet 127, which is considered to be the signal indicating that the milk can safely be discharged, or that the valve 126 can be opened, as the case may be. For safety's sake the valve 126 is not opened until the switch 130 has been kept in the depressed state for at least a presettable period of time, by default for five seconds. The coupling member 132 of the discharge line can, as for example in the present embodiment, be a screwed connection, but may alternatively be a so-called bayonet fit or a gripping clamp coupling. The tube 129 or carrier of the device 128 can be bolted around the discharge outlet 127 by means of one or more bolts 133 which are inserted along a circle in the tube 129 and which bear against the discharge outlet 127 and thus clamp the detection device 128 onto the discharge outlet 127. The connecting bolts 133 constitute at the same time a setting feature by means of which it can be achieved that the switch 130 does not make contact i.e. applies a signal to the computer 9, until the coupling member 132 substantially completely in the coupled state. For such a setting the bolts 133 are temporarily loosened for positioning the device 128 at a larger or less large distance from the discharge outlet. In the case in which the coupling 122 is in the form of a gripping clamp coupling, the switch 130 may alternatively in accordance with the invention be positioned in the path through which the lever of this type of coupling pivots. According to the invention, a further protection of the switching device 128 can be obtained by means of a guard, not shown in the drawings, which intersects at least the imaginary extension of the discharge outlet 127 and which preferably also forms a shield at the upper side and at the side edges. Preferably, this guard is pivotal about a pivotal shaft provided between the valve 125 and the switching device, at the upper side of the discharge tube and transversely thereto. The section through the extension of the discharge outlet 127 by said guard renders it necessary to pivot the guard to allow a desired connection of a discharge tube. According to the invention, this pivotal motion is utilized by having the guard, in a stable position in which the guard has been pivoted out of the extension of the discharge outlet 127, bear against a switch which, via a co-called interrupt, causes the computer 9 to start a continuous check on the state of the switch 130. Closing the guard terminates in the same manner this continuous check, but does not mean that checking the position of the switch 130 has been rendered impossible. Checking of the switch 130 by the computer 9 is possible at any moment, as soon as this is deemed desirable as part of a procedure. Such a provision reduces the occupation of the computer 9 during the relatively long intervening moments in which the discharge outlet 127 cannot be used.

Such a guard may also be used as an additional safety measure when a switch 130 or a similar contact element has not been provided on the discharge tube, but is, for example, in the form of a button provided in the environment. In that case it is up to the person who discharges the milk to ascertain whether the discharge line has been properly connected and also to remember to depress the button. Should the guard not have been swung clear here has for its result that pushing the button does not have any effect.

FIG. 8 further shows an embodiment in which the detection device, arranged between the switch 130 and a coupling member 132 to be connected, includes a ring 133 which is provided with a fit around the tube portion 129 by means of a plain bearing 134. The ring 133 is prevented from sliding by means of one or more hooks attached to the flange 131 which in the present embodiment is constituted by a ring 135 with a few turned-in bolts 36. The ring 133 is kept clear from the flange 133 and consequently from the switch 130 by means of a pressure spring 137 arranged between the flange 131 and the ring 133 and around the tube 129. Such a construction prevents that the switch 130 is depressed by a coupling member 132 which is out of alignment and/or that the pin 138 of the switch 130 gets jammed in the bore of the flange 131. The ring 135 protects the embodiment shown from dirt. It should further be noted that the ring 133, or the switch pin 138 when the first-described simple construction is used, can project, depending on the shape of the discharge outlet 127 or the coupling member 132, for a larger or less large extent beyond the tube 129, either in the direction parallel to the tube, or transversely thereto.

Figure 9:
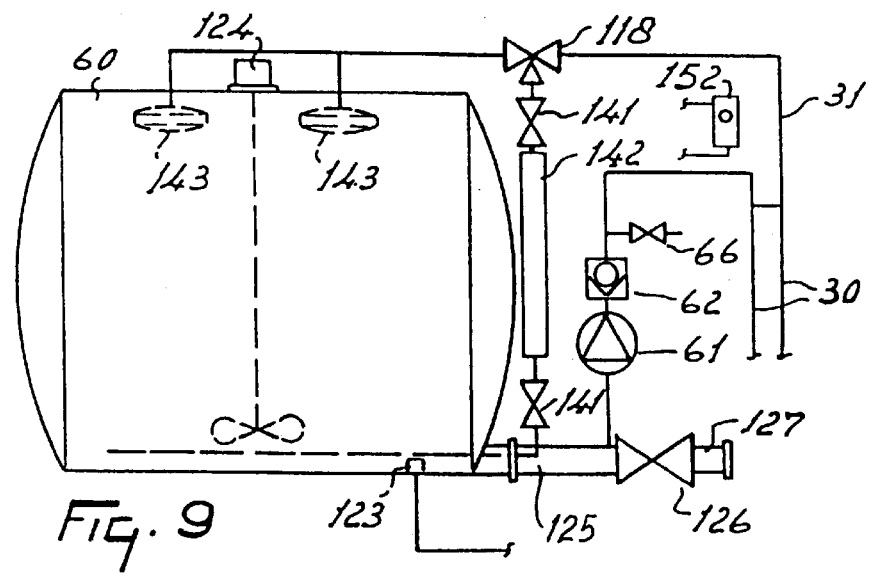
FIG. 9 is a schematic survey of a milk storage implement, a milk filter having been accommodated at the exterior side of the milk tank in the ring line.

FIG. 9 shows an embodiment of the milk storage implement, the valve 118 and the filter 67 having been disposed outside the milk tank 60. In this situation that extreme end portion of the ring line 133 that discharges the milk extends through the wall of the tank 60. To that end, the aperture in the present embodiment is provided in a first portion 125, which has a larger diameter, of the ring line 31. In the midway point of this line portion the milk-discharging line portion is bent in such a manner that the bent portion extends parallel to the discharge line 125 and the bottom of the tank 60. The line portion 125 which is contiguous to an aperture in the tank 60 and includes the valve 126 and the discharge outlet 127, has a larger diameter than the further portion of the ring line 31 so as to enable accelerated emptying of the tank 60. The milk-discharging extreme end portion of the ring line 31 continues inside the tank 60 till near that wall portion of the tank that faces the supply inlet for the supply line 125. In the present embodiment a valve 141 which can be operated manually as well as by the computer 9 is incorporated in the discharging line portion of the ring line 31, both before and after the filter 142. This renders it possible to replace the filter 142 without any milk getting lost from the tank 60 via the opened filter 142 in accordance with the communicating vessel principle, or that milk present in the upper part of the ring line 31 flows away. Near the filter 142 there is a switch 152, by means of which a signal can be applied to the computer 9 to indicate a desired replacement of the filter 142. Operating this switch has for its result that the computer 9 stops pumping milk from the collecting glass 12 to the tank 60 of all the milking plants connected to the ring line 31, or postpones this pumping operation, as the case may be. Also the permission for a milk animal still to be milked to enter is postponed until the switch has been switched off. Operating the switch also has for its effect that the pump 61 is stopped. The embodiment shown in FIG. 9 comprises two spray heads 143, which increases the possible feed-through of spray fluid to such an extent that cleaning of the tank wall can already be effected on the supply of cleaning fluid to the storage implement. A valve 117 for a free flow into the tank, as in FIG. 8, is then superfluous.

Figure 10:
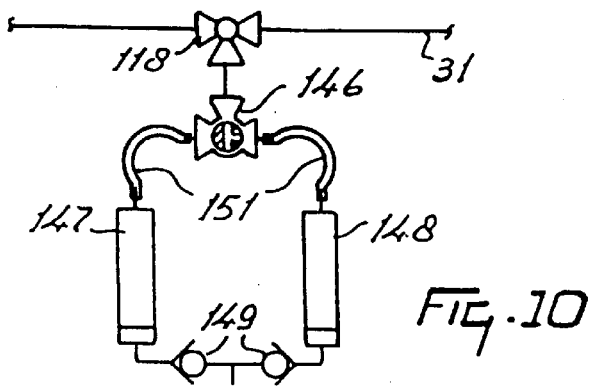
FIG. 10 is a schematic representation of an alternative for a milk filter implement, such as shown, for example, in FIG. 9.

FIG. 10 shows a device for a milk filter, for which temporarily stoppage of the milking plant is not necessary. To that end the storage construction includes two filters 147, 148 which are incorporated in a local branching point of the ring line 31. At that side of the filters 147, 148 to which the milk is supplied, branching of the line is realized with the aid of a valve 146 which in a first neutral position causes the milk to flow along both filters 147, 148 and in a second and a third position causes the milk to flow along the one or the other filter, respectively. At that side of the filters from which the milk is discharged, both branches of the ring line 31 are provided with a non-return valve 149 which prevents milk from refluxing via the filter 147, 148 opposite to it. To enable replacement of a filter 147, 148, the filters 147, 148 are each connected to the valve 146 via a flexible line portion 151. In normal operation the valve 146 is in the neutral position so that in neither of the two filters milk is stagnant for a long period of time. For the purpose of replacing a filter, the valve 146 is adjusted to the second or the third position as a result of which the ring line 31 can temporarily continue to function via the opposite filter 146, 148. The position shown in FIG. 10 causes the milk to flow from the valve 118 via the filter 148 shown on the right. The filter structure shown in FIG. 10 is preferably placed in the position of filter 142 shown in FIG. 9. The valves 141 are then superfluous.

The mode of operation of the construction, in supplementation of the patents already mentioned in the foregoing, is as follows. After the robot 3 has detected in a manner known per se the location of a teat and has placed the relevant teat cup 10 under this teat, the shut-off device 14 of the milk line 11 of the relevant teat cup 10 is energized by a signal from the computer causing it to open so that a vacuum is produced in the teat cup 10 and the latter can be connected. In a similar manner the other three teat cups 10 are connected one after the other to the teats.

It may happen during milking of a milk animal that a teat cup 10 becomes detached from a teat of the milk animal, for example because it hooks behind a milk line 11 and kicks the teat cup. In the construction in accordance with the present invention the computer 9 immediately signals with the aid of the sensor 6 the resultant drop in pressure in the vacuum. In response thereto the computer 9 energizes in the first instance the relevant shut-off device 14 and in the second instance a mechanism for withdrawing a connecting element present between the relevant teat cup 10 and the end of the robot arm 5. As a result of the immediate withdrawal of the connecting element which in the present embodiment is flexible, a detached teat cup 10 is pulled up against the end of the robot arm 5 before the teat cup 10 has landed on the floor. In this manner contamination of the teat cup 10 is prevented. The teat cup 10 may therefore, after it has been withdrawn to its initial position on the robot arm 5 be reconnected without the need for cleaning. The criterion for the reconnection is that an adjacent teat cup 10, in the case of front pair, and a rear pair of teat cups are still in their connected state at the desired reconnection moment.

In a further, simpler embodiment in accordance with the invention a teat cup 10 lands on the floor after it has become uncoupled by kicking. In that case, independently of the setting of the computer by the farmer, an action of the farmer is awaited, or it is automatically decided on the basis of one or more preset criteria, to reconnect the teat cup 10 or to refrain from further milking of the entire udder or the remaining quarters, as the case may be. The criterion on the basis of which the computer 9 decides to continue milking, can be set by the farmer and is based in accordance with a first relatively simple embodiment on the period of time elapsed since the last teat cup 10 was connected, or, to the farmer's option, since the connection of the first teat cup 10. In a second embodiment of the milking construction said criterion is based on the remaining time available for milking the animal. The time still available to finish milking of a relevant animal is determined from the anticipated time required to finish the relevant animal. The anticipated time required for milking is for the first milking run an estimated default value of ample duration or, otherwise, a time set by the farmer. The first anticipated time is thereafter adapted each time after a milking run to the recent historically required milking times recorded by the computer 9. The remaining time still available at the moment at which a teat cup 10 becomes uncoupled is determined by reducing the available time by the milking time already elapsed. Otherwise, for the case in which the total anticipated time for milking the cattle stock exceeds the actually available time for the milking robot 3, the available time is automatically corrected by a factor which represents the ratio of the total anticipated milking time for all the animals to be milked to the actual time available for the milking robot.

If the total anticipated milking time is less than the time actually available to the milking robot in each milking round of a cattle stock, exceeding the anticipated milking time is always possible until the free time available for the relevant milking round to the milking robot has been used up. For the animals which are milked in the present second embodiment after the spare time available to the robot has been used up, there is thereafter no more time available than the anticipated milking time per milk animal. The embodiments described are based on three milking rounds per 24 hours' period for a stock of 40 to 50 cows. The anticipated required milking time is updated for each quarter by the computer 9. The time required to milk a given quarter is automatically derived by the computer 9 from the start and end times at which the milk flow sensors 8 detect a milk flow.

In addition, also in accordance with the invention, the milking construction can be of such an implementation that the sequence in which the teat cups 10 are connected to the teats of an udder corresponds to the mutual sequence in a decreasing order of the anticipated milking time of the quarters of the relevant udder. In a further, simpler embodiment in accordance with the present invention the rear and thereafter the front pair of teats, rear and front being taken in the direction in which the robot arm 5 approaches the udder, are first connected. Of each pair of teats the quarter with the longest anticipated milking time of each pair of teats is connected first. This simple embodiment also includes a different method in accordance with the invention, in which, in the case a teat cup is kicked from the teat, reconnection is only effected if the teat cup 10 for the adjacent teat is still in the coupled state.

If on the basis of one of the above-described criteria it is automatically determined to reconnect an inadvertently uncoupled teat cup 10 and if, indicated by the data in the computer, cleaning of the teat cup is desirable, the entire milking cluster is then detached and subjected to a so-called intermediate rinsing operation which will be described hereinafter. Preceding the intermediate rinsing operation, the collecting glass 12 is emptied. The decision to automatically reconnect the milking cluster is therefore only taken if the expected quantity of milk remaining in the quarter which according to expectations still has the highest quantity of milk, is not less than a percentage to be preset by the former, by default 10%, of the anticipated yield of the same quarter still holding the greatest quantity of milk. Thereafter a second condition must be satisfied before automatic reconnection is effected. This condition consists in that, after the time required for cleaning and reconnection of the milking cluster has been deducted, sufficient time is still available to collect a reasonable quantity of milk. The remaining available time which is considered to be sufficient, can be preset by the farmer and amounts by default to one minute. Cleaning a teat cup 10 which was inadvertently uncoupled is not necessary if the milk of the milked animal will be discharged to the waste milk dump 35. This is, for example, the case when the cow yields colostral milk, is treated with penicillin or is troubled with mastitis. In that case reconnection of the uncoupled teat cup will be effected, if possible, without a preceding removal of the entire milking cluster.

If on the basis of the above rules the cow is not milked further, a procedure for removing the milk animal from the milking parlour and to allow another animal to enter is initiated. The remaining milking time not spent on the removed animal the computer 9 adds to the actual time still available to the milking robot 3 in a milking round. The above-described methods for reconnection of a teat cup may have been combined, according to the invention, with an organizational milking method in which each animal is free to choose, within predetermined time limits, the moment of her milking turn. In this situation it applies that an animal cannot be milked until a period of time which must be preset in the computer 9, by default six hours, has elapsed after a previous milking turn. If a milk animal stays away from the milking robot 9 for a period of time exceeding an also presettable period of time, by default seven hours, then the animal is entered, as long as it has not reported in the milking parlour, in a list for attention of the farmer. In this situation it is up to the farmer to ensure that the animal arrives in the milking parlour at some moment. The said time limits can be updated per animal in the computer 9. The time limits for an animal leaving a lactation period, are automatically updated to eight or nine hours, respectively.

Said so-called intermediate rinsing operation consists of rinsing the milking construction with tepid water, which rinsing operation is performed via the pipe lines 56 and 16 at both the exterior side and the interior side of the teat cups 10. To distribute the rinsing water, the valve 93 is continuously kept open during the rinsing operation, whilst valve 46 is opened at regular intervals, for example one second open and three seconds closed. During the intermediate rinsing operation the valve 56' is also opened for a given time. Preceding the rinsing operation of the collecting glass, the valve 40' is however opened first to fill the reservoir 36 with tepid water up to the first of the three levels to which the level sensor 39 can be adjusted. So as to convey the rinsing water through the pipe lines, the shut-off device 14 and the vacuum valve 18 are opened simultaneously with closure of the valve 40'. Such a so-called intermediate rinse is performed each time after the milk of a milked animal has been discharged to the waste milk dump 35 and each time after a presettable period in which no milking animal has appeared at the milking robot, by default a period of half an hour, has elapsed. Such a so-called intermediate rinse is furthermore effected in the embodiment in which a teat cup 10 lands on the floor after uncoupling, each time it has become uncoupled.

After a longer period of time, which can be preset in the computer, by default every eight hours, has elapsed, a cleaning and disinfecting rinse is automatically performed. For this purpose the computer 9 activates the displacement pump 42' for admixture of basic cleaning and disinfecting agent. The temperature of the rinsing solution is high (700° to 80° C). The cleaning operation is preceded by a rinse with tepid water which is thereafter discharged to the sewer. After preparation of the cleaning fluid, the valves 25, 32 and 33 are adjusted such that the cleaning fluid passed through the teat cups 10 and the collecting glass 12 is circulated via the rinsing water reservoir 36 during a presettable period of time, by default five minutes, whereafter the rinsing fluid is discharged to the sewer line 37 via the valve 19. Hereafter the reservoir 36 is filled with cold water for a rinse to cool the milking plant and to remove residual disinfecting agent. This rinsing agent is discharged to the sewer. The same procedure is performed at longer intervals, in the present case every fortnight, with an aggressive and acid cleaning agent which removed deposit in the form of salts. Hot water is used in this procedure. During the rinsing operation the valve 46 is kept open and closed at intervals in the manner already described above.

The milk storage device 59 is rinsed each time after it has been emptied, for example by a milk collection service, which for that purpose connects a discharge line 139 to the discharge outlet 127 of the tank 60. Connecting the milk discharge line 139 to the discharge outlet 127, has, in accordance with the invention, for its result that the process computer 9 signalizes that a discharge line has been connected. In response thereto the process computer 9 adjusts itself in such a manner that, after the milking run then in progress, a subsequent milk animal is not permitted to enter one or more milking robots or milking plants, as the case may be, connected to the storage implement 59, and/or the robot is temporarily put out of operation. The computer 9 also responds to this signal by stopping the pump 61 and controlling the valve 126 in the discharge line 125 of the tank 60 to an open state, although with some built-in delay, in response to the signal that a discharge line 139 has been connected. In this situation the computer 9 also drives a mechanism, not further shown in the drawings, which locks a handle for manual operation of the valve 126. This drive eliminates the lock, which releases the possibility to close the valve 126 manually, more specifically in the event of a calamity. When the valve 126 is in its open state, emptying of the tank 60 can be started, which is usually effected with the aid of a pump arranged outside the milk storage device 59. The process computer 9 ensures that the valve 126 is returned to its closed state as soon as it has been detected via the level sensor 123 that the tank 60 is empty, or as soon as it has been detected that the tank 60 is not empty, but that the discharge line 139 is not or at least not adequately connected. As part of this operation of monitoring emptying of the tank 60, the computer 9 detects, on the basis of a memory value which represents the status of a milking robot, whether all the milking robots connected to the milk storage device 59 have terminated the milking run in progress at the moment at which the discharge line is connected. That is to say that via the sensor 27 it is ascertained that the milking glass of the relevant robot 3 is empty. This is usually already the case quite some time before emptying of the tank 60. The process computer 9 then initiates, simultaneously with initiating the operation in which emptying of the tank 60 is monitored and the sequential completion of the milking runs, an intermediate rinse for each of the robots 3. Since each of the robots 3 is connected to a rinsing line 16 on one and the same rinsing water reservoir 36, they are rinsed one after the other. If after each of the robots 3 has been rinsed the tank is not yet empty, those robots 3, of which the last disinfecting rinse was furthest back in time are subjected to a disinfecting rinse, whilst omitting the prerinse. This is thereafter repeated after each disinfecting rinse. If it has been found by means of the level sensor 23 that the tank 60 is indeed empty, the valve 61 is closed and a customary disinfecting rinse is applied to the tank 60. For that purpose the fluid collected in the reservoir 36 is pumped in a manner already described to the storage implement 59 via the pipe line system and the pump 24 of one of the robots 3. The fluid then flows into the tank 60 via the valves 25, 118 and 117. After the process computer 9 has detected, for example via the sensor 27, that all the fluid has been pumped off, the valve 117 is closed and the circulation pump 61 is made operative for a certain period of time. In this situation the position of the valve 118 is adjusted such that the fluid is passed through the spray head 121. The pressure of the fluid causes the spray head 121 to roll in such a manner that the major portion of the tank wall is cleaned. Subsequent to this operation, the computer checks whether the discharge line 139 has already been decoupled, the valve 126 in the discharge line 125 is kept in its open position until it has been detected via the level sensor 123 that the tank 60 is empty. If the discharge line 139 has not yet been disconnected from the discharge outlet, the valve 126 is kept in its closed position and a very shrill sound signal is produced. The fact that the valve 126 stays in its closed position means in this phase of the procedure that the cleaning procedure is postponed. As soon as any coupling member 132 is removed from the discharge outlet 127, the valve 126 in the discharge line 125 is kept open until via the level sensor 123 it has been detected that the tank 60 is empty. The above-described rinsing procedure applies to both the main and the pre- and final rinse. In addition, the storage implement 59, and also the milk line system of the robot 3, are always submitted after a predetermined time, which can be preset in the computer, to an acid rinse for removing deposit. Such an acid rinse of the tank 60 then follows after a disinfecting rinse. As soon as all the rinses of the tank 60 desired at a given moment are performed in accordance with the computer program which is based on the above rules, the said postponements are cancelled, so that inter alia milk animals are again admitted, and the milking procedure or method already described is continued.

The above-described device for automatically renewing or displacing the milk filter 85 operates as follows.

Before the computer 9 supplies a signal for energizing the adjusting cylinder 97, a signal for closing the valve 100 in the supply line portion 89 is first supplied and removing the flanges 91, 92 from each other is not effected until the time required for closing the valve 100 has elapsed. During activation of the adjusting cylinder 97 the flanges 91, 92 have both their upper and their lower edge completely detached from each other due to the eccentrically placed pivotal shaft. In its rest condition the arm extends upwardly and at an acute angle to the sectional plane and is moved by means of the intermediate rod about its shaft 106 in the direction of the sectional plane so that the filter film is rolled from the upper bobbin 87 unto the lower bobbin 86. The lower bobbin 86 has a relatively large diameter, so that when the arm 107 performs a stroke the contaminated filter portion is completely pulled beyond the tube aperture and the flanges 91, 92 and the increase in the diameter of the film roll on the lower bobbin 86 has only a limited influence on the distance through which later portions of the film 85 are displaced. The slotted hole 109 in the connection between the arm 107 and the intermediate rod 108 ensures that the lower bobbin 86 is not rotated until the lower and upper edges of the flanges 91, 92 are completely detached from each other.

For driving the device, the computer 9 can be preset by the farmer to one of several rules. The first thereof is that a displacement of the film filter is realized each time after a presettable number of milking turns. A second possibility is to realize the displacement of the filter 85 as soon as the computer 9 determines a limit value which is presettable by the farmer, for the pressure difference between the sensors 101, 102 before and behind the filter. The third technical feature consists in that the filter 85 is displaced after a presettable number of milking turns, or always after the computer 9 has detected that the aforementioned limit value for the pressure difference has been exceeded. In the embodiment in accordance with the invention a displacement is not performed in all cases until after the milk pump 24 has been deactivated after the collecting glass 12 has been emptied. The number of displacements is updated by the computer and compared to the number of possible displacements preset by the farmer, on the basis of the length of the filter film 85. On the basis of this comparison the computer 9 supplies, as soon as the film 85 threatens to get off the upper bobbin 87, a warning signal to indicate that a roll of film on the bobbins 86, 87 must be replaced. In the present embodiment a comparison is always effected prior to a milking round of a cattle stock between the remaining quantity of filter film 85 and the expected number of displacements on the basis of the number of milking runs in the milking round to be started and if it is detected there is not enough filter film 85 for the relevant round a warming signal is also supplied. The filter device is further used to ascertain the degree of contamination of the milk of a finished milking turn and optionally to initiate on the basis thereof a disinfecting rinsing cycle of the milking plant. To that end, during discharging of the milk from the collecting glass 12 the pressure difference in the milk flow before and behind the filter is recorded and checked, with the aid of the pressure sensors 101, 102. If the increase in the pressure difference during pumping of the milk exceeds a predetermined limit value which can be preset by the farmer, the milk is apparently contaminated to such an extent, irrespective of the absolute value of the pressure difference, that a cleaning and disinfecting rinsing cycle and a displacement of the milk filter is automatically performed. The oblique configuration of the flanges 91, 92 has the advantage that the filter surface area is large with respect to the cross-section of a line portion 89, 91, that the residual drops caused when the flanges are detached from each other are guided in an improved manner and that the filter film 85, when it is no longer sufficiently taut, as a result of the force of gravity, automatically remains in position in the guide formed by the hollow profile of the flange 91. When because of one of the above-described or other manners the computer 9 has determined a desired replacement, displacing the filter together with the associated closure of the valve 100 and temporary stoppage of the pump 61 are not effected until all the possible operations of emptying the collecting glass 12 of the connected milking plants in progress, have ended. During the displacement, the start of an operation for emptying a collecting glass 12 is obstructed. Thus, the risk that a milking plant is delayed by the displacement of the filter is significantly reduced, whilst the automatic displacement ensures that stoppage of the circulating pump 61 is of the shortest possible duration.

The invention is not limited to the features described in the foregoing, but also relates to all the details shown in the drawings. The invention further relates to all sorts of alternatives in the construction, and/or the methods described, of course in sofar they are within the wordings of the following, attached claims.

We claim:

1. A milking apparatus including a milk circulation line and comprising a milk storage and cooling tank and a pump, said pump circulating the milk sequentially through said circulation line and said tank, said pump, said circulation line and said tank comprising a circuit for circulating milk, the apparatus further comprising a supply line and a milking machine, said milking machine connected to said supply line to supply milk via said supply line to said circulation line, a milk filter in said supply line that filters milk passing from said milking machine via said supply line to said circulation line.

2. A milking apparatus in accordance with claim 1, wherein said circulation line comprises a line portion on the discharge side of said pump that discharges the milk into said tank, said supply line being connected to said line portion.

3. An apparatus in accordance with claim 2, wherein a milk-supplying end of said circulation line is received in said tank near the bottom thereof.

4. An apparatus in accordance with claim 1, comprising an automatic milking robot and cleaning means that automatically cleans the teats of an animal being milked.

5. An apparatus in accordance with claim 4, comprising a computer which controls said milking robot and said cleaning means.

6. A milking apparatus including a milk circulation line and comprising a milk storage and cooling tank and a pump, said pump circulating the milk sequentially through said circulation line and said tank, said pump, said circulation line and said tank comprising a circuit for circulating milk, the apparatus further comprising a supply line and a milking machine, said milking machine connected to said supply line to supply milk via said supply line to said circulation line, a milk filter in said supply line that filters milk passing from said milking machine via said supply line to said circulation line, said circulation line comprising a valve having a first position that connects said circulation line to an inlet into said tank, and a second position for connecting said circulation line to a further line portion leading to a spray head in said tank.

7. A milking apparatus comprising a bulk milk tank and a milking inlet line leading into said bulk milk tank which includes a valve, said valve having a first position that connections to a first line portion having an end which extends into the tank and defines an obstruction-free passage into said tank from said valve, said valve having a second position that connections to a second line portion which define a passage to a spray head located in said tank for cleaning and disinfecting said tank.

8. An apparatus in accordance with claim 7, wherein said spray head is located in said tank near the upper interior wall thereof.

9. A milking apparatus including a milk circulation line and comprising a milk storage and cooling tank and a pump, said pump circulating the milk sequentially through said circulation line and said tank, said pump, said circulation line and said tank comprising a circuit for circulating milk, the apparatus further comprising a supply line and a milking machine, said milking machine connected to said supply line to supply milk via said supply line to said circulation line, a milk filter in said supply line that filters milk passing from said milking machine via said supply line to said circulation line, said circulation line containing a valve having two positions, one of said positions connecting said circulation line to a spray head in said tank, and the other position of said valve connecting said circulation line to a conduit for supplying milk into said tank.

10. An apparatus in accordance with claim 9, comprising a process computer that controls the position of said valve.

11. An apparatus in accordance with claim 9, comprising a milk filter in said line portion through which milk passes into said tank.

12. An apparatus in accordance with claim 9, comprising a lid on said milk tank and a tank-feed portion of said circulation line which passes milk into said tank via a connection therefor in said lid, said tank-feed portion including a flexible line conduit.

13. A milking apparatus comprising a milk circulation line, a milk tank, a pump, said pump circulating milk in sequence through said tank and said circulation line, a milk supply line connected to said circulation line, a milking machine connected to said supply line, said circulation line including a line portion in said tank, said line portion in said tank including a filter, said filter being disposed within said tank.

14. An apparatus in accordance with claim 13, comprising a milk-discharging line portion of said circulation line, said pump and a non-return valve being in said milk-discharging line portion.

15. An apparatus in accordance with claim 14, comprising a supply line that is connected to said circulation line between said non-return valve and said filter.

16. An apparatus in accordance with claim 13, wherein said filter comprises a removable, tubular filter.

17. A milking apparatus comprising a milk circulation line, a milk tank, a pump, said pump circulating milk in sequence through said tank and said circulation line, a milk supply line connected to said circulation line, said circulation including a line portion in said tank, said line portion in said tank including a filter, said tank comprising a lid, said filter being connected to said lid.

18. A milking apparatus which comprises a circulation line including a tank which constitutes part of a recirculation circuit, said tank comprising an inlet and an outlet for receiving and discharging milk flowing through said circulation line in said recirculation circuit, said inlet comprising a conduit which is surrounded by said outlet where said inlet enters said tank.

19. In an automatic milking system, a fluid circuit for circulating milk and other fluids that comprises, connected in sequence with respect to normal fluid flow, a bulk milk tank, a discharge outlet, a pump, a check valve, a line portion and an inlet to said bulk milk tank, said line portion being operatively connected to a source of compressed air for direct injection of said compressed air into said line portion.

20. In an automatic milking system, a circuit for circulating milk and other fluids including a cleaning solution that comprises in sequence in the direction of flow a bulk milk tank, a discharge outlet, a pump, a check valve, a line portion and an inlet to said bulk milk tank, a discharge cock being provided between said discharge outlet and said pump, said discharge cock being connected to said circuit for discharging said milk from said bulk milk tank.

21. In an automatic milking system, a fluid circuit for circulating milk and other fluids that comprises, connected in sequence, a bulk milk tank, a discharge outlet, a pump, a check valve, a line portion and an inlet to said bulk milk tank, said line portion being connected to a source of compressed air, further comprising a filter in said line portion, said line portion including sensor means for informing a process computer that replacement of said filter is required.

22. In an automatic milking system, a fluid circuit for circulating milk and other fluids that comprises, connected in sequence, a bulk milk tank, a discharge outlet, a pump, a check valve, a line portion and an inlet to said bulk milk tank, said line portion being connected to a source of compressed air, further comprising liquid sensor means in said bulk milk tank which relays a signal to a process computer whether or not said bulk milk tank contains a liquid.

23. An automatic milking apparatus comprising a milking compartment for the animal being milked, a computer controlled robot for emplacing and removing teat chips from an animal being milked, a bulk milk tank which is connected to said teat cups via a passageway, a source of cleaning fluid mounted on said milking compartment and means for conveying cleaning fluid from said source via said passageway to said bulk milk tank.

24. An apparatus in accordance with claim 23, comprising a circulation line, said circulation line including said passageway and interconnecting said bulk tank and said cleaning fluid source, said passageway including a check valve.

25. In a system for cleaning milking apparatus comprising teat cups and a milk deaeration unit which are interconnected by passageways, a source of cleaning fluid, a first line for carrying cleaning fluid from said source of cleaning fluid to said teat cups and via the interior of said teat cups to said deaeration unit and a second line for carrying cleaning fluid from said cleaning fluid source to said deaeration unit without passing through said teat cups or said passageways.

26. A system in accordance with claim 25, comprising a first line portion, said first line portion interconnecting said source of cleaning fluid and said first line and second line.

27. A system in accordance with claim 26, wherein said first line and said second line each contain a valve.

28. A system in accordance with claim 26, wherein said deaeration unit forms a collecting container for milk, a cleaning fluid spray means in said deaeration unit which is in flow communication with said second line.

29. A system in accordance with claim 28, wherein said cleaning fluid spray means comprises a ring projecting into said collecting container, said ring having at its center a flow-through aperture and centrifugal and upwardly directed spray apertures connected to said flow-through aperture.

30. A system in accordance with claim 28, comprising a discharge line from said deaeration unit and sequentially in said discharge line a further valve and a pump, a sensor in said discharge line between said further valve and said pump for detecting the presence of fluid therein.

31. A system in accordance with claim 25, comprising a third line interconnected to an external water supply line and disposed for cleaning the exterior of said teat cups, a process computer controlled valve incorporated in said third line.

32. A system in accordance with claim 31, comprising a cassette which is connected to said third line and is adapted to be received on the upper planar surface of said teat cups for cleaning the external surfaces of said teat cups.

33. A system in accordance with claim 25, comprising a fourth line connected to an external water supply line, a cleaning implement for cleaning the udders of animals received in a milking compartment, a carrier for said cleaning implement, said four line including a further process computer controlled valve for controlling fluid flowing from said water supply line to said four line for selectively cleaning said carrier of said cleaning implement.

34. A system in accordance with claim 33, comprising a fifth line connected to a cleaning concentrate supply line, said cleaning concentrate supply line being connected to a cleaning element for cleaning udders.

35. A system in accordance with claim 34, comprising a storage vessel for cleaning concentrate, said fifth line including a mixing pump, said mixing pump also connected to said storage vessel and adapted to mix said cleaning concentrate from said storage vessel with water from said fourth line to be used for cleaning said udders.

36. An automatic milking apparatus for milking animals such as cows and for periodically cleaning and disinfecting the system after milk has been discharged therefrom, the apparatus comprising a milking circuit that includes a circulation line and a bulk milk tank, a milking compartment, robot means for engaging and disengaging teat cups from the teats of animals in said compartment, a supply line connecting said teat cups to said circulation line, a deaeration unit in said supply line, a reservoir for rinsing fluid, a feedback line from said deaeration unit to said reservoir, a source of warm water and a first line interconnecting said warm water source and said reservoir, a cold water source and a second line therefrom to said reservoir, an acid source and a third line therefrom to said reservoir, and an alkaline cleaning agent source and a fourth line therefrom to said reservoir, said first line and said second line each containing respective process computer controlled valves, said third line and said fourth line each containing respective process computer controlled pumps.

37. An apparatus in accordance with claim 36, comprising a milk filter in said circulation line and a process computer-operable member associated with said filter for automatically renewing said filter.

38. An apparatus in accordance with claim 37, comprising a sectional cut through said circulation line, said filter being movable by said process computer-operable member relative to said cut.

39. An apparatus in accordance with claim 38, wherein each side of said cut is fitted with flange means for clamping and guiding said filter when it is filtering milk passing through said circulation line and when it is being moved relative to said flange means respectively.

40. An apparatus as claimed in claim 39, wherein faces of said flange means are coated with an elastic material.

41. An apparatus in accordance with claim 38, wherein said milk line comprises line portions on either side of said sectional cut therethrough, said line portions being pivotal relative to each other about a pivotal shaft spaced away from said sectional cut.

42. An apparatus in accordance with claim 38, wherein said sectional cut is biased relative to said milk line and the cross-sectional area of said filter in said sectional cut is greater than the cross-sectional area of said milk line.

43. An apparatus in accordance with claim 38, comprising bobbins, said filter being wound about said bobbins and displaceable by winding one of said bobbins while the other of said bobbins is being unwound.

44. An apparatus in accordance with claim 43, comprising a process computer controlled electric motor coupled to said one winding bobbin for selectively winding said filter in accordance with commands from said process computer.

45. An apparatus in accordance with claim 43, wherein a shaft is connected to an axle for said one winding bobbin, said shaft and said axle being interconnected by a ratchet mechanism.

46. An apparatus in accordance with claim 37, wherein said process computer-operable member composes a pneumatic control element.

47. An apparatus in accordance with claim 37, comprising a computer-operable valve in said milk line immediately upstream, considered from the direction of flow of milk through said milk line from said filter.

48. An apparatus in accordance with claim 37, comprising two pressure sensors which are connected to a process computer, one of said sensors being downstream of said filter and the other of said sensors being upstream of said filter, considered in the direction of flow of milk through said milk line.

49. An apparatus in accordance with claim 48, wherein said process computer-operable member operates automatically to renew said filter when the pressure upstream of said filter exceeds by a predetermined and presettable limit value of the pressure of the milk in said milk line downstream of said filter.

50. An apparatus in accordance with claim 49, which is isolated by a three-way valve from a bulk milk tank, said valve being downstream of said filter, the apparatus comprising components for cleansing and rinsing the milking apparatus upstream of said three-way valve when the pressure upstream of said filter sensed by said pressure sensor so located exceeds by a predetermined and presettable limit value of the pressure sensed by said sensor downstream of said filter.

51. An apparatus in accordance with claim 50, comprising a milk supply line connected to said three-way valve, said supply line being connected to a circulation line and a bulk milk tank.

52. An apparatus in accordance with claim 36, comprising a bulk milk tank and means for isolating said bulk milk tank from the remainder of said apparatus, and control means for initiating a cleansing and rinsing procedure of said remainder of said apparatus after a presettable time interval within which no animal has entered said milking compartment.

53. A milking apparatus including a milk circulation line and comprising a milk storage and cooling tank and a pump, said pump circulating the milk sequentially through said circulation line and said tank, said pump, said circulation line and said tank comprising a circuit for circulating milk, the apparatus firther comprising a supply line and a milking machine, said milking machine connected to said supply line to supply milk via said supply line to said circulation line, a milk filter in said circulation line that filters milk passing through said circulation line.

54. A milking apparatus in accordance with claim 53, wherein said circulation line comprises a line portion on the discharge side of said pump that discharges said milk into said tank, said supply line being connected to said line portion.

55. An apparatus in accordance with claim 54, wherein a milk-supplying end of said circulation line is received in said tank near the bottom thereof.

56. An apparatus in accordance with claim 53, comprising an automatic milking robot and cleaning means that automatically cleans the teats of an animal being milked.

57. An apparatus in accordance with claim 56, comprising a computer which controls said milking robot and said cleaning means.

58. An apparatus in accordance with claim 53, wherein said circulation line comprises a valve having a first position that connects said circulation line to an inlet into said tank, and a second position for connecting said circulation line to a further line portion leading to a spray head in said tank.

59. An apparatus in accordance with claim 53, wherein said circulation line contains a valve having two positions, one of said positions connecting said circulation line to a spray head in said tank, and the other position of said valve connecting said circulation line to a conduit for supplying milk into said tank.

60. An apparatus in accordance with claim 59, comprising a process computer that controls the position of said valve.

61. An apparatus in accordance with claim 59, comprising a milk filter in said line portion through which milk passes into said tank.

62. An apparatus in accordance with claim 59, comprising a lid on said milk tank and a tank-feed portion of said circulation line which passes milk into said tank via a connection therefor in said lid, said tank-feed portion including a flexible line conduit.

* * * * *